UNITED STATES PATENT OFFICE.

AUGUST STOCK AND OTTO NICODEMUS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYES OF THE TRIPHENYLMETHANE SERIES AND PROCESS OF MAKING SAME.

1,217,238.  Specification of Letters Patent.  Patented Feb. 27, 1917.

No Drawing.  Application filed June 22, 1915. Serial No. 35,616.

*To all whom it may concern:*

Be it known that we, AUGUST STOCK, Ph. D., chemist, and OTTO NICODEMUS, Ph. D., chemist, citizens of the Empire of Germany, residing at Höchst-on-the-Main, Germany, have invented certain new and useful Improvements in Dyes of the Triphenylmethane Series and Processes of Making Same, of which the following is a specification.

In U. S. Patents Nos. 677,279 and 689,025 are described red to violet dyestuffs of the triphenylmethane series, obtainable by condensing α-substituted indols with non-alkylated or alkylated amino-ketones of the type "diaminobenzophenone" in presence of hydrochloric acid without using a condensing agent.

According to our present invention, such dyestuffs of the triphenylmethane series are also very easily produced by condensing in presence of hydrochloric acid 4-halogen-4¹-aminobenzophenone, its derivatives substituted in the amino group by a hydrocarbon residue and its homologues, that is to say, ketones containing only one amino group, with indols substituted in α-position. Although these products are of little technical value, they yield very valuable dyestuffs by substituting for the halogen a residue of an aromatic amin. The dyestuffs thus obtained may, if required, be transformed by sulfonation into acid dyestuffs which are dark powders soluble in water with a violet to blue color, in concentrated sulfuric acid with an orange-yellow color, turning violet to blue when poured in much water and dyeing wool violet to blue tints, remarkable for their great fastness to light, and in this respect greatly surpass all violet acid dyestuffs of the triphenylmethane series hitherto known, particularly those described in the above-mentioned U. S. patents.

The halogen-aminobenzophenones to be used can be produced with a very good technical yield according to German Patent No. 41751 from anilids of para-halogenbenzoic acids with the corresponding bases in presence of phosphorus oxychlorid.

The following examples illustrate our invention, the parts being by weight.

Example I: 200 parts of the dyestuff, obtained by condensing 4-chloro-4¹-dimethyl-aminobenzophenone (melting point 129–130° C.) with N-ethyl-α-phenylindol, are heated for 2–3 hours to 120–130° C. with 5–6 times its weight of p-anisidin, whereupon the bluish-violet molten mass is poured, while stirring, into diluted acid and the dyestuff thus separated is filtered off. When dry, the latter forms a powder with a bronze-like luster, which is scarcely soluble in water and dissolves in concentrated sulfuric acid with an orange-yellow coloration.

The sulfonation of the dyestuff is effected by introducing it into ten times the quantity of sulfuric acid monohydrate and stirring at 60° C. until a sample dissolves in ammonia to a clear solution. The mass is then poured upon ice and the sodium salt precipitated by means of common salt. The resulting dyestuff dyes without blotting wool a bluish-violet tint of remarkable fastness to light.

When using 4-chloro-4¹-diethylaminobenzophenone (melting at 160° C.) and N-ethyl-α-phenylindol, a dyestuff possessing quite similar properties is obtained.

Example II: 200 parts of the dyestuff obtained by condensing 4-chloro-2¹-methyl-4¹-dimethylaminobenzophenone (melting at 86° C.) with N-ethyl-α-phenylindol are heated for 2–3 hours to 120–130° C. with 5–6 times the weight of p-phenetidin, the blue molten mass is poured, while stirring, into diluted acid and the separated dyestuff filtered off. When dry, the dyestuff forms a powder of the following formula:

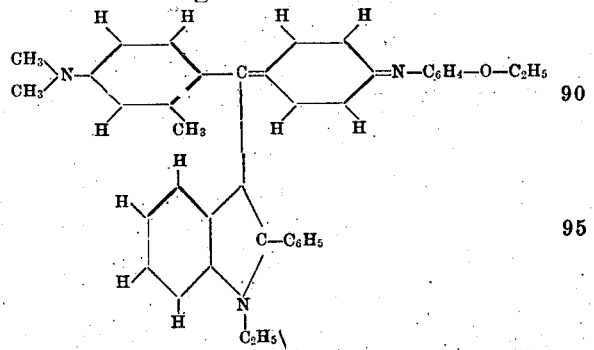

with a bronze-like luster, scarcely soluble in water, which, after sulfonation according to the indications in Example I, yields a sulfonic acid, being a dark powder, soluble in water with a reddish-blue color in concentrated sulfuric acid with an orange-yellow color, turning blue when poured in much water, and dyeing wool reddish blue tints of great fastness to light. If instead of p- phenetidin, p-anisidin or p-toluidin are used, dyestuffs of nearly the same properties are obtained.

Example III: 200 parts of the dyestuff produced by condensing 4-chloro-4¹-dimethylaminobenzophenone or 4-chloro-4¹-dimethylaminobenzophenone or 4-chloro-4¹-diethylaminobenzophenone with N-benzyl-α-methylindol (boiling at 220–230° C. and 15 m/m) are treated, as indicated in Examples I and II, with p-phenetidin and the molten mass worked up in a like manner. The resulting dyestuff, which is insoluble in water, after being introduced into 10 times the quantity of monohydrate, dissolves to a yellowish-red solution and can be transformed by heating for a short time to 50° C. into its sulfonic acid. On pouring the mixture upon ice and precipitating it by means of common salt, the sodium salt thereof is obtained which dyes wool violet tints of great fastness.

Example IV: 200 parts of the dyestuff obtained by condensing 4-chloro-4¹-phenylmethylaminobenzophenone (melting at 195° C.) with N-ethyl-α-methylindol are treated with p-toluidin and worked up as above indicated. By introducing the basic dyestuff into monohydrate and heating for a short time to 50°, it is easily converted into the corresponding sulfonic acid which dyes wool bluish-violet tints of great fastness to light. When substituting for the p-toluidin, m-toluidin, p-phenetidin or p-anisidin, dyestuffs of similar properties are obtained.

Example V: 200 parts of the dyestuff obtained by condensing 4-chloro-4¹-dimethylaminobenzophenone and N-ethyl-α-methylindosulfonic acid are treated with p-phenetidin and worked up as above indicated. Thus a sulfonic acid is obtained which dyes wool bluish-violet tints of excellent fastness to light and to alkalis.

Having now described our invention, what we claim is:

1. The process of making violet to blue dyestuffs of the diarylindylmethane series, which consists in heating with an aromatic base the dyestuffs produced by condensing 4-halogen-4¹-aminobenzophenones with an indol derivative substituted in α-position, and sulfonating those products of the reaction which do not yet contain any sulfo group.

2. The process of making a new blue dyestuff of the diaryl-indylmethane series, which consists in heating with p-phenetidin the dyestuff obtained by condensing 4-chloro-2¹-methyl-4¹-dimethylaminobenzophenone with N-ethyl-α-phenylindol, and sulfonating the coloring matter thus obtained.

3. The hereinbefore described new dyestuffs, being sulfonic acids of dyestuffs of the following formula:

$$\begin{array}{c} R_1 \\ R_2 \end{array}\!\!>\!\!N\text{--}Ar_1\text{--}\underset{\underset{X}{|}}{C}\!\!=\!\!Ar_2\!\!=\!\!N\text{--}Ar_3$$

wherein $R_1$ and $R_2$ stand for a hydrocarbon residue; $Ar_1$ $Ar_2$ $Ar_3$ for aryl residues and X for an indol derivative substituted in α-position, being dark powders soluble in water with a violet to blue color, in concentrated sulfuric acid with an orange-yellow color, turning violet to blue when poured in much water, and dyeing wool violet to blue tints of excellent fastness to light.

4. The hereinbefore described dyestuff, being a sulfonic acid of the dyestuff of the following formula:

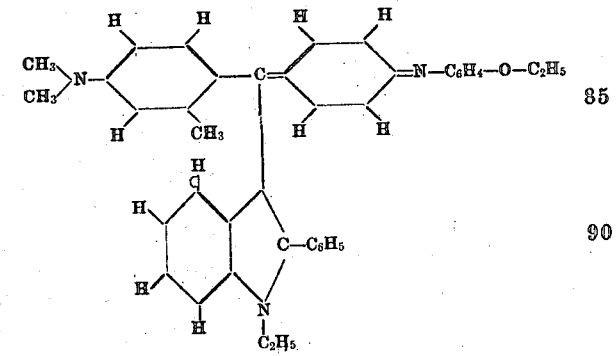

being a dark powder, soluble in water with a reddish-blue color, in concentrated sulfuric acid with an orange-yellow color, turning blue when poured in much water and dyeing wool a blue tint with a red hue of great fastness to light.

In testimony whereof, we affix our signatures in presence of two witnesses.

AUGUST STOCK.
OTTO NICODEMUS

Witnesses:
  JEAN GRUND,
  CARL GRUND.